United States Patent
Considine et al.

(10) Patent No.: US 8,272,418 B2
(45) Date of Patent: Sep. 25, 2012

(54) APPARATUS, SYSTEM, AND METHOD FOR MANUFACTURING IRREGULARLY SHAPED PANEL FILTERS

(75) Inventors: Ana R. Considine, Portage, WI (US); Larry T. Gunderson, Sun Prairie, WI (US); David D. Helgeson, St. Louis Park, MN (US); Amy K. Luttropp, Madison, WI (US); Steven Stokstad, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 813 days.

(21) Appl. No.: 11/876,632

(22) Filed: Oct. 22, 2007

(65) Prior Publication Data

US 2008/0107765 A1 May 8, 2008

Related U.S. Application Data

(60) Provisional application No. 60/862,356, filed on Oct. 20, 2006.

(51) Int. Cl.
  *B29C 53/06* (2006.01)
(52) U.S. Cl. ........ 156/474; 156/459; 156/510; 156/578; 156/204; 156/258; 425/291; 425/297; 425/302.1
(58) Field of Classification Search .................. 156/443, 156/459, 474, 510, 578, 199, 204, 205, 250, 156/257, 258; 425/142, 215, 216, 290, 291, 425/296, 297, 302.1, 303, 315
See application file for complete search history.

(56) References Cited

U.S. PATENT DOCUMENTS

| | | | | |
|---|---|---|---|---|
| 2,995,481 A | * | 8/1961 | Muller | 428/132 |
| 3,025,963 A | * | 3/1962 | Bauer | 210/493.4 |
| 3,052,163 A | * | 9/1962 | Schubert | 493/39 |
| 3,161,557 A | * | 12/1964 | Muller | 156/462 |
| 3,226,280 A | * | 12/1965 | Muller | 156/510 |
| 3,244,302 A | * | 4/1966 | Best | 264/269 |
| 3,321,345 A | * | 5/1967 | Duncan | 156/91 |
| 3,383,449 A | * | 5/1968 | Muller | 264/287 |
| 3,514,364 A | * | 5/1970 | Yamaguchi | 425/315 |
| 3,656,513 A | * | 4/1972 | Evans et al. | 138/141 |
| 3,886,026 A | * | 5/1975 | Kienel | 156/361 |
| 3,998,140 A | * | 12/1976 | Andre | 493/435 |
| 4,083,741 A | * | 4/1978 | Goldberg | 156/184 |
| 4,357,190 A | * | 11/1982 | Fouss et al. | 156/244.13 |
| H000556 H | * | 12/1988 | Tarko | 156/379.8 |
| 4,829,742 A | * | 5/1989 | Romagnoli | 53/134.2 |
| 4,940,500 A | | 7/1990 | Tadokoro et al. | |
| 4,948,445 A | * | 8/1990 | Hees | 156/196 |
| 4,976,677 A | * | 12/1990 | Siversson | 493/413 |
| 5,215,609 A | * | 6/1993 | Sanders | 156/70 |
| 5,240,479 A | * | 8/1993 | Bachinski | 96/17 |

(Continued)

*Primary Examiner* — Joseph Del Sole
*Assistant Examiner* — Seyed Masoud Malekzadeh
(74) *Attorney, Agent, or Firm* — Andrus, Sceales, Starke & Sawall, LLP

(57) ABSTRACT

Described herein are various embodiments of an apparatus, system and method for manufacturing irregularly shaped panel filters. For example, according to one illustrative embodiment, a system for manufacturing irregularly shaped panel filters includes a filter medium source, a scoring section in filter medium receiving communication with the filter medium source, a first gathering section in filter medium receiving communication with the scoring section, an unfolding section in filter medium receiving communication with the first gathering section, a shaping section having a laterally moveable cutting portion in filter medium receiving communication with the unfolding section, and a second gathering section in filter medium receiving communication with the shaping section.

20 Claims, 6 Drawing Sheets

U.S. PATENT DOCUMENTS

| | | | |
|---|---|---|---|
| 5,273,560 A | 12/1993 | Kadoya et al. | |
| 5,376,218 A * | 12/1994 | Mito et al. | 156/474 |
| 5,468,330 A * | 11/1995 | Ryan et al. | 156/443 |
| 5,622,583 A | 4/1997 | Ernst et al. | 156/204 |
| 5,804,014 A * | 9/1998 | Kahler | 156/204 |
| 5,846,376 A * | 12/1998 | Gossett et al. | 156/356 |
| 5,919,122 A | 7/1999 | Geiger et al. | |
| 5,928,452 A * | 7/1999 | McFall et al. | 156/269 |
| 5,980,675 A * | 11/1999 | Tsuchihashi et al. | 156/197 |
| 6,159,318 A * | 12/2000 | Choi | 156/167 |
| 6,230,776 B1 * | 5/2001 | Choi | 156/441 |
| 6,230,777 B1 * | 5/2001 | Hedlund et al. | 156/443 |
| 6,364,978 B1 * | 4/2002 | Skov et al. | 156/73.1 |
| 6,379,409 B1 * | 4/2002 | Dijkman | 55/381 |
| 6,558,777 B2 * | 5/2003 | Yoshii | 428/182 |
| 6,615,893 B2 * | 9/2003 | Hedlund et al. | 156/443 |
| 6,616,785 B2 * | 9/2003 | Hedlund et al. | 156/218 |
| 6,887,343 B2 * | 5/2005 | Schukar et al. | 156/195 |
| 7,217,333 B2 * | 5/2007 | Sundet et al. | 156/196 |
| 7,235,115 B2 * | 6/2007 | Duffy et al. | 55/497 |
| 7,597,773 B2 * | 10/2009 | Kume et al. | 156/205 |
| 7,625,418 B1 * | 12/2009 | Choi | 55/521 |
| 2003/0089090 A1 | 5/2003 | Sundet et al. | |
| 2003/0172633 A1 * | 9/2003 | Duffy | 55/495 |
| 2004/0118771 A1 * | 6/2004 | Schukar et al. | 210/493.4 |
| 2006/0000544 A1 * | 1/2006 | Hunter | 156/244.11 |
| 2006/0065592 A1 | 3/2006 | Terres et al. | |
| 2007/0089828 A1 * | 4/2007 | Treier et al. | 156/205 |
| 2007/0251634 A1 * | 11/2007 | Choi | 156/204 |
| 2008/0168637 A1 * | 7/2008 | Ballard et al. | 29/24.5 |
| 2009/0294042 A1 * | 12/2009 | Takahashi et al. | 156/248 |

* cited by examiner

APPARATUS, SYSTEM, AND METHOD FOR MANUFACTURING IRREGULARLY SHAPED PANEL FILTERS

CROSS REFERENCE TO RELATED APPLICATION

This application claims the benefit of U.S. Provisional Application No. 60/862,356, filed Oct. 20, 2006, which is incorporated herein by reference.

FIELD

The present disclosure relates to manufacturing panel filters, and more particularly to an apparatus, system, and method for manufacturing irregularly shaped panel filters.

BACKGROUND

Panel or panelette filters for removing particulate matter from fluids flowing through the filters are known in the art. For example, panel filters are commonly used in the automotive industry to remove particulate matter from air flowing through an air intake system into an internal combustion engine or from air flowing through a heating and/or air conditioning system into the interior cabin of a vehicle.

Panel filters can be regularly shaped, i.e., a square or rectangular shape, or irregularly shaped, i.e., a non-square or non-rectangular shape. Due to tighter constraints in the automotive industry, and in particular, the engine system of automobiles, it has become increasingly difficult to package and design regularly shaped filters that meet desirable performance characteristics and adequately fit within the confines of the engine system. Accordingly, filter manufacturers have increasingly moved to irregularly shaped filters, which provide more flexibility in filter and filter housing geometries to meet desirable performance characteristics and fit within the confines of the engine system.

Panel filters for automotive applications typically include at least one sheet of filtering media, such as paper, held in place by a frame or housing. The sheet of filter media typically has a plurality of pleats that extend from one end to an opposite end of the sheet. The pleats are sealed together at the ends of the filtering media sheet to prevent fluid from escaping from one side of the sheet to the other without traveling through the filter. The pleats can be sealed together using any of several methods. For example, in some conventional filters, the filtering media sheet is potted into or sealingly inserted into the filter frame using plastisol or urethane. In other conventional filters, a bonding adhesive, such as hot melt, is applied to the ends of the pleated sheet prior to securing the sheet to the frame or housing. Generally, hot melt sealing typically results in a lower pressure drop across the filter and thus is preferred over other sealing methods.

Mass producing filter media using continuous pleating process techniques involves feeding a continuous roll of paper through an apparatus in a paper feed direction and forming the continuous sheet into a plurality of individual filter sheets. Although hot melt sealing can be used to manufacture regularly shaped panel filters using conventional continuous pleating process techniques, it is not practical for the manufacturing of irregularly shaped filters using the same conventional techniques for various reasons. For example, in conventional continuous pleating process techniques, the pleats are gathered together in a gathering station after the hot melt is applied to the ends of the sheets, which are parallel to paper feed direction. Many rollers are required to force the pleats to gather. The rollers must avoid contact with the hot melt to prevent damage to the seal. With regularly shaped filters, the rollers can grab the sheet at all locations between the ends of the paper because the hot melt is positioned at the ends of the sheet. If, however, the sheet is irregularly shaped, one or more of the ends of the sheets are angled or curved toward each other (see, e.g., FIGS. 4 and 5). Therefore, the rollers, which avoided the hot melt on regularly shaped filters, would roll directly over the hot melt on irregularly shaped filters, thus potentially damaging the seal. Accordingly, a need exists for the ability to manufacture irregularly shaped and hot melt sealed panel filters using continuous pleating process techniques.

SUMMARY

The subject matter of the present disclosure has been developed in response to the present state of the art, and in particular, in response to the problems and needs in the art that have not yet been fully solved by currently available continuous pleating process techniques for the manufacture of irregularly shaped panel filters. Accordingly, described herein are embodiments of an apparatus, system and method for manufacturing irregularly shaped panel filters that overcome at least one of the above-discussed or other shortcomings in the art. For example, at least one of the embodiments described herein provides an apparatus, system or method for manufacturing irregularly shaped panel filters with hot melt seals using continuous pleating process techniques.

According to one illustrative embodiment, a system for manufacturing irregularly shaped panel filters includes a filter medium source that is capable of dispensing a continuous length of filter medium. The system also includes a scoring section in filter medium receiving communication with the filter medium source. The scoring section is operable to form score lines in the filter medium. The system further includes a first gathering section in filter medium receiving communication with the scoring section. The first gathering section is operable to fold the filter medium along the score lines. The system further includes an unfolding section in filter medium receiving communication with the first gathering section. The unfolding section is operable to unfold the folded paper filter medium received from the first gathering section. The system also includes a shaping section in filter medium receiving communication with the unfolding section. The shaping section includes at least one head that has a filter medium cutting portion. The at least one head is moveable laterally across a width of the filter medium. Additionally, the system includes a second gathering section in filter medium receiving communication with the shaping section. The second gathering section is operable to re-fold the filter medium along the score lines.

In some implementations, the at least one head includes a hot melt applicator. In some implementations, the filter medium cutting portion includes a shearing blade that is operable to cut away portions of the filter medium. In yet some implementations, the first gathering section is operable to maintain the filter medium in a folded configuration for a predetermined period of time.

In some implementations, the filter medium cutting portion includes a perforating blade that is operable to form perforations in the filter medium. In these implementations, the system may include a filter preparation section in filter medium receiving communication with the second gathering section. The filter preparation section is operable to discard perforated sections of the filter medium.

In yet some implementations, the first and second gathering sections each comprise at least two pair of opposing filter medium guides and at least one filter medium driving roller. Each pair of opposing filter medium guides is operable to at least partially resist movement of the filter medium therebetween. The at least one filter medium driving roller is operable to drive the filter medium between the at least two pair of opposing filter medium guides. In certain implementations, the driving force generated by the at least one filter medium driving roller necessary for driving roller for driving the filter medium between the filter medium guides of the first gathering section may be more than the driving force generated by the at least one filter medium driving roller necessary for driving the filter medium between the filter medium guides of the second gathering section. In such instances, the first gathering section includes a first number of filter medium driving rollers and the second gathering section includes a second number of filter medium driving rollers. The first number is greater than the second number.

In some implementations, the at least one head of the shaping section is moveable laterally across the width of the filter medium at a predetermined speed such that the cutting portion cuts the filter medium to form at least one edge that is angled with respect to the length and the width of the filter medium. In certain instances, the at least one head may include a hot melt applicator such that as the at least one head moves laterally across the width of the filter medium at the predetermined speed, the hot melt applicator is operable to apply a bead of hot melt on the filter medium along and adjacent the at least one edge.

In some implementations, the at least one head includes a first head having a filter medium cutting portion and a second head having a hot melt applicator. The first and second heads are independently moveable laterally across the width of the filter medium According to another illustrative embodiment, an apparatus for manufacturing irregularly shaped panel filters includes a filter medium source, a filter medium scoring section, and a filter medium shaping section. The filter medium source is capable of dispensing a continuous length of filter medium in a feed direction. The filter medium scoring section is downstream of the filter medium source and is operable to form score lines in the filter medium. The filter medium shaping section is downstream of the filter medium scoring section. The shaping section includes at least one head that has a filter medium cutting portion and a hot melt applicator. The at least one head is moveable laterally across a width of the filter medium at a predetermined speed to cut the filter medium with the cutting portion to form at least one edge that is angled with respect to the length and width of the filter medium and to apply a length of hot melt on the filter medium alongside the at least one edge with the hot melt applicator.

In some implementations, the cutting portion includes a perforating blade. In these implementations, the at least one head is moveable laterally across the width of the filter medium at the predetermined speed to perforate the filter medium with the perforating blade.

In some implementations, the apparatus further includes first and second gathering sections, and an unfolding section. The first gathering section is intermediate the filter medium scoring section and the filter medium shaping section. The second gathering section is downstream of the filter medium shaping section. The first gathering section is operable to fold the filter medium along the score lines to form a plurality of pleats. The second gathering section is operable to re-fold the filter medium along the score lines to re-form the plurality of pleats that were unfolded by the unfolding section.

In certain implementations, the apparatus also include a controller that is electrically coupled to the filter medium shaping section and operable to control the lateral position and speed of the at least one head. In certain implementations, the predetermined speed of the at least one head is changeable as the at least one head moves laterally across the width of the filter medium. In yet certain implementations, the at least one edge formed by the cutting portion includes a plurality of edges each angled with respect to an adjacent edge. Further, in certain implementations, the at least one edge formed by the cutting portion includes a curved portion.

According to another embodiment, a method for high-volume manufacturing of irregularly shaped panel filters can include the actions of feeding a continuous length of filter paper in a lengthwise direction and scoring the filter paper to form score lines in the filter paper. The method can also include the action of providing a moveable head having a cutting portion and a hot melt portion. Also, the method includes cutting a plurality of irregularly shaped sheets successively along a length of the filter paper with the cutting portion by moving the head into any lateral position along a width of the paper to form an edge of each sheet that is angled with respect to the length and width of the respective sheet. Simultaneous with cutting the irregularly shaped sheets to form the angled edge, the method includes applying hot melt along the edge with the hot melt portion. The method further includes folding the filter paper along the score lines and unfolding the filter paper prior to cutting the plurality of irregularly shaped sheets. Also, the method includes folding the sheet along the score lines after cutting and applying hot melt to a respective one of the plurality of irregularly shaped sheets.

In some implementations, the cutting portion includes a perforating portion. In these implementations, cutting a plurality of irregularly shaped sheets may include perforating a plurality of irregularly shaped sheets. Accordingly, the angled edge may include a perforated edge. In certain implementations, the method includes removing a section of the filter paper along the perforated edge of the respective irregularly shaped sheets.

In some implementations, moving the head into any lateral position along a width of the paper includes moving the head at any of a plurality of predetermined speeds. Moving the head may include moving the head at a plurality of predetermined speeds.

In yet some implementations, folding the filter paper prior to cutting the plurality of irregularly shaped sheets includes driving the filter paper into a first gathering mechanism using a first driving force. Also, folding the sheet after cutting and applying hot melt to the sheet includes driving the sheet into a second gathering mechanism using a second driving force less than the first driving force.

Reference throughout this specification to features, advantages, or similar language does not imply that all of the features and advantages that may be realized with the apparatus, system and method of the present disclosure should be or are in any single embodiment of the disclosed apparatus, system and method. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics of the disclosed apparatus, system and method may be combined in any suitable manner in one or more embodiments. One skilled in the relevant art will recognize that the disclosed subject matter may be practiced without one or more of the specific features or advantages of a particular embodiment. In other instances, additional features and advantages may be recognized in certain embodiments that may not be present in all embodiments.

BRIEF DESCRIPTION OF THE DRAWINGS

In order that the advantages of the disclosed apparatus, system and method will be readily understood, a more particular description of the disclosed subject matter briefly described above will be rendered by reference to specific embodiments that are illustrated in the appended drawings. Understanding that these drawings depict only exemplary embodiments of the disclosed subject matter and are not therefore to be considered to limit the scope of the subject matter, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the apparatus, system or method disclosed in the application. Thus, appearances of the phrases "in one embodiment," "in an embodiment," and similar language throughout this specification may, but do not necessarily, all refer to the same embodiment.

Furthermore, the described features, structures, or characteristics of the apparatus, system and method disclosed herein may be combined in any suitable manner in one or more embodiments. In the following description, numerous specific details are provided to provide a thorough understanding of embodiments of the disclosed subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of disclosed subject matter.

Figure 1:
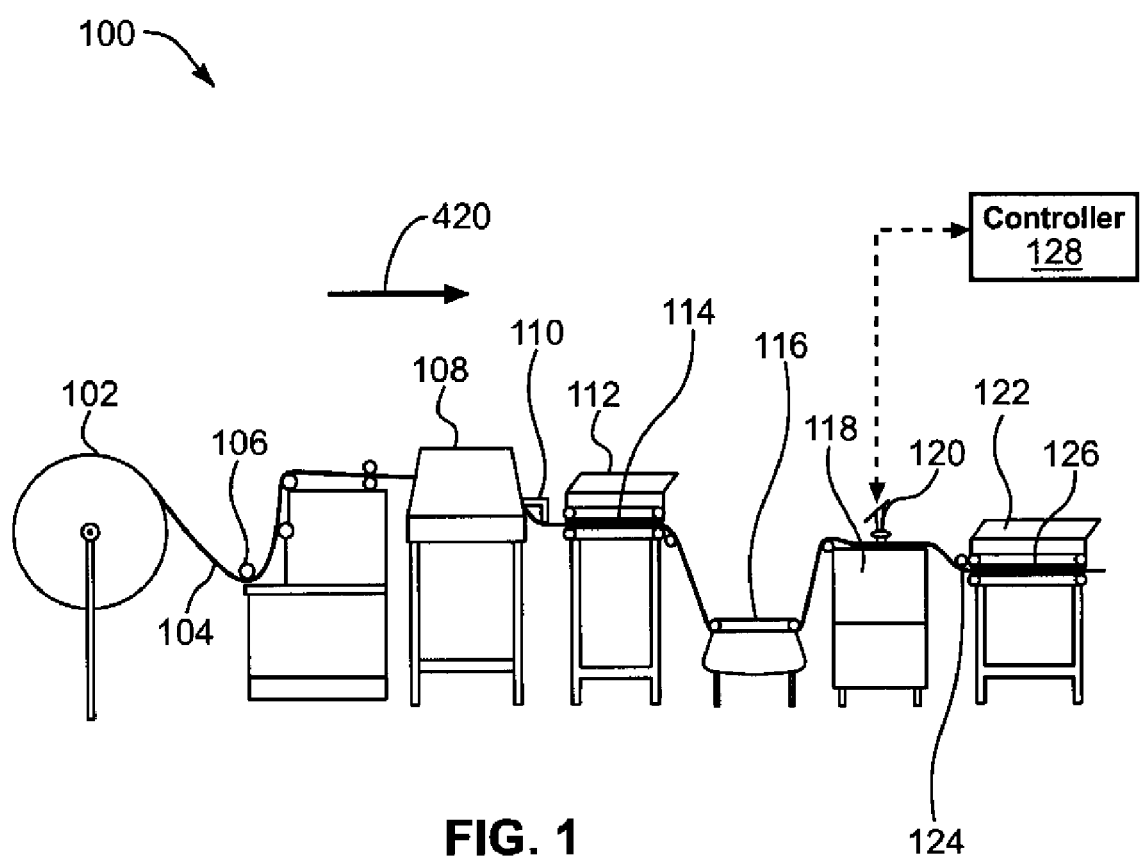
FIG. 1 is a side view of a system for manufacturing irregularly shaped panel filters according to one representative embodiment.
Figure 4:
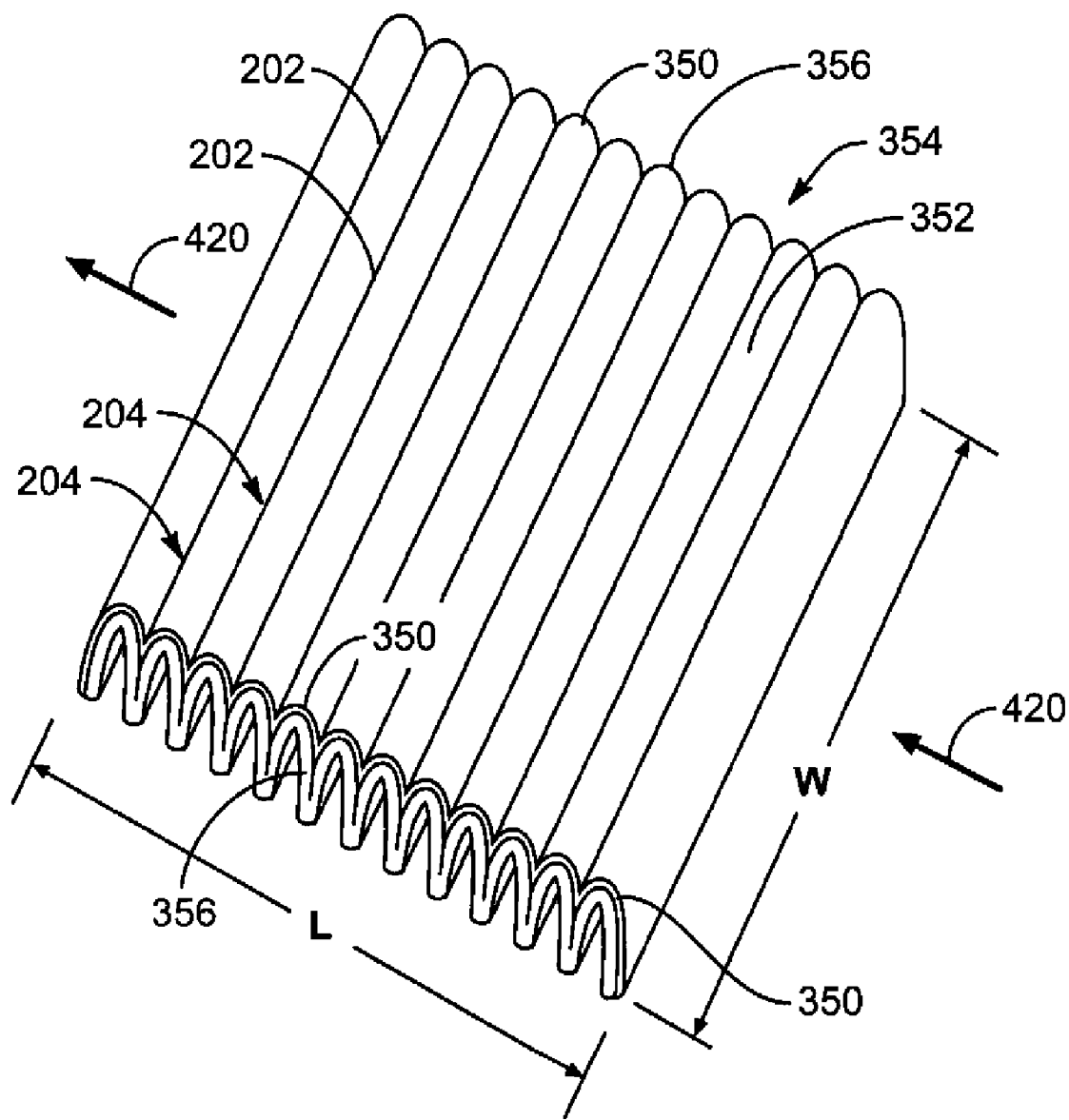
FIG. 4 is a detailed perspective view of an irregularly shaped panel filter filtering sheet according to one exemplary embodiment.

As shown in FIG. 1, and according to one particular embodiment, a system 100 for manufacturing irregularly shaped panel filters includes a filter medium source, such as filter medium roll 102, for supplying a continuous length or strip of a filter medium 104. In certain implementations, the filter medium is a paper. In other implementations, the filter medium is a foam, fiberglass, and/or cotton material. The continuous length of filter medium 104 has a length dimension (see, e.g., dimension L of filter sheet 354 shown in FIG. 4) extending parallel to the length of the strip and a width or transverse dimension extending perpendicular or transversely relative to the length (see, e.g., dimension W of filter sheet 354 shown in FIG. 4). The filter medium 104 is feed from the roll 102 and through the system 100 in a filter medium feed direction, e.g., upstream to downstream direction. Accordingly, the various components or stations of the system 100 will be described according to whether they are positioned upstream of downstream relative to other components of the system.

The system 100 further includes a stripper section 106 positioned downstream of the filter medium roll 102. The stripper section 106 receives the filter medium 104 from the roll 102 and prepares the filter medium for entry into a scoring section 108.

Figure 2:
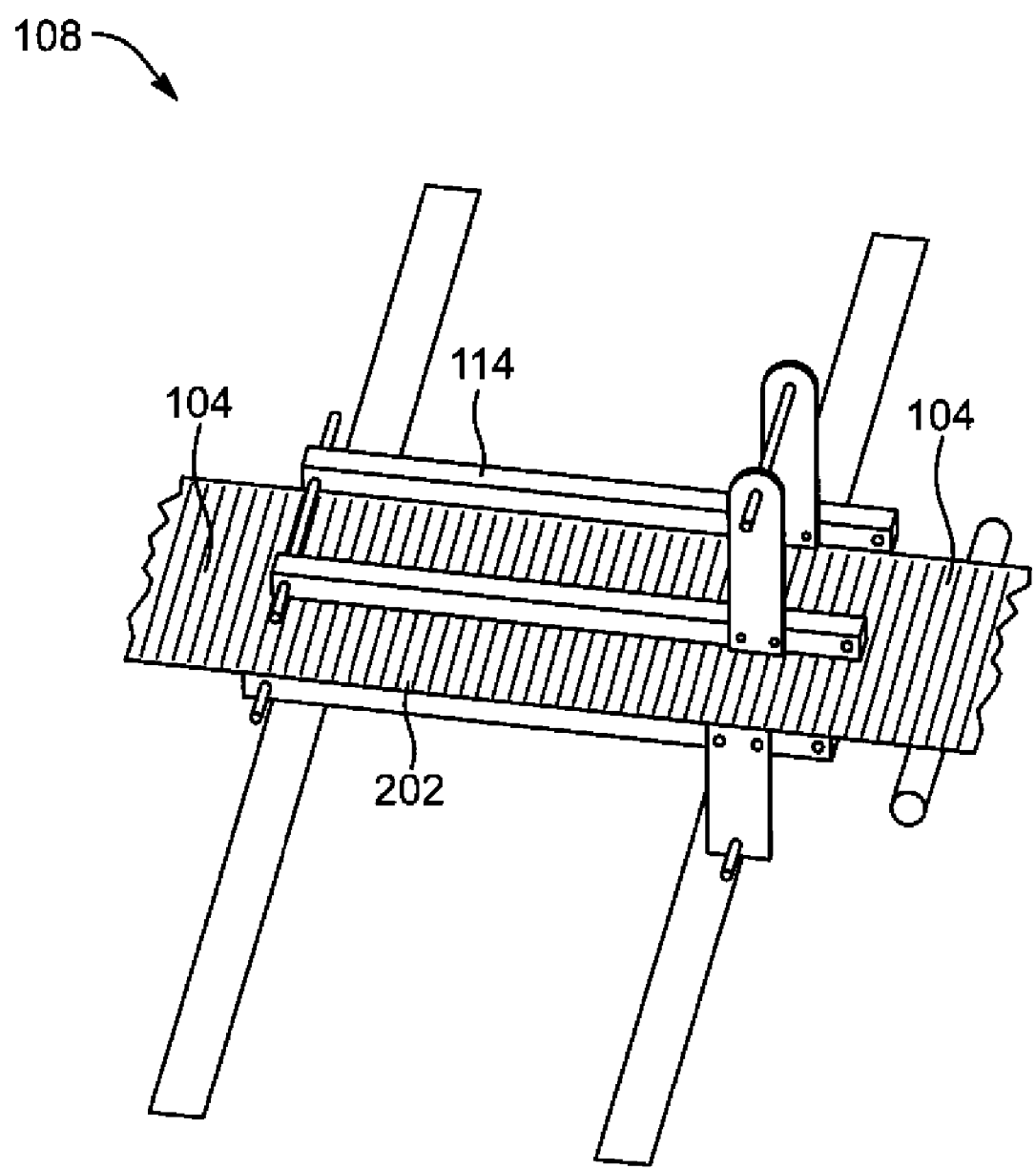
FIG. 2 is a perspective view of a gathering station of the system of FIG. 1.

The scoring section 108 is positioned downstream of the stripping section 106 and receives the filter medium 104 from the stripping section. As is commonly known in the art, the scoring section 108 includes patterning tools to form any of various desired features in the filter medium. For example, the scoring section 108 can include a scoring tool that is controllable to form a plurality of spaced-apart score lines 202, e.g., folding or pleat lines, that extend parallel to each other along the width of the strip of filter medium 104 (see FIG. 2). In other words, the folding lines extend perpendicular to the feed direction, which is depicted as direction arrow 420 in the illustrated embodiments. The scoring section 108 can also include an embossing tool for forming embossed lines in the filter medium that extend parallel to each other and the feed direction. Further, if desired, the scoring section 108 can include a corrugating tool for forming corrugations in the filter medium.

From the scoring section 108, the filter medium 104 is feed to a first filter medium gathering section 112. The first gathering section 112 includes driving rollers upstream of two sets of paired skis 114 (see FIG. 2). The driving rollers 110 include a set of one or more opposing roller wheels between which the filter medium 104 moves. The driving rollers 110 drive the filter medium between the two sets of paired skis 114, which are selectively controllable to resist movement of the filter medium between the skis by gripping down on the filter medium with a controllable force. With movement of the filter medium between the skis being restricted, further driving of the driving rollers 110 cause the filter medium to bend or fold along the score lines to form a plurality of pleats, e.g., pleats 204, spaced-apart in the feed direction 420 (see FIG. 4). The force exerted by the driving rollers must be sufficient to bend the filter medium at each of the score lines and form the plurality of pleats. Typically, the force exerted by the driving rollers is proportional to the number of driving rollers. In other words, the more driving rollers employed, the higher the force.

After the pleats are formed, the pleated portion of the filter medium is held in the first gathering section 112 for a predetermined period of time to induce a pleat memory into the filter medium. The predetermined period of time is at least partially dependent on the type of filter medium being used. For example, in certain implementations, the filter medium is paper and the predetermined period of time is between several seconds and several minutes.

After the pleated portion of the filter medium is held by the first gathering section 112 for the predetermined period of time, the pleated portion of the filter medium is feed into a stretching, or unfolding, section 116 downstream of the first gathering section 112. The stretching section 116 receives the pleated portion and collapses, such as by straightening, flattening, unfolding, and/or stretching, the pleats such that the filter medium is again substantially flat. Although the pleats are collapsed or removed, the score lines, embossing, corrugations and/or other desired features remain formed into or onto the filter medium.

Figure 3:
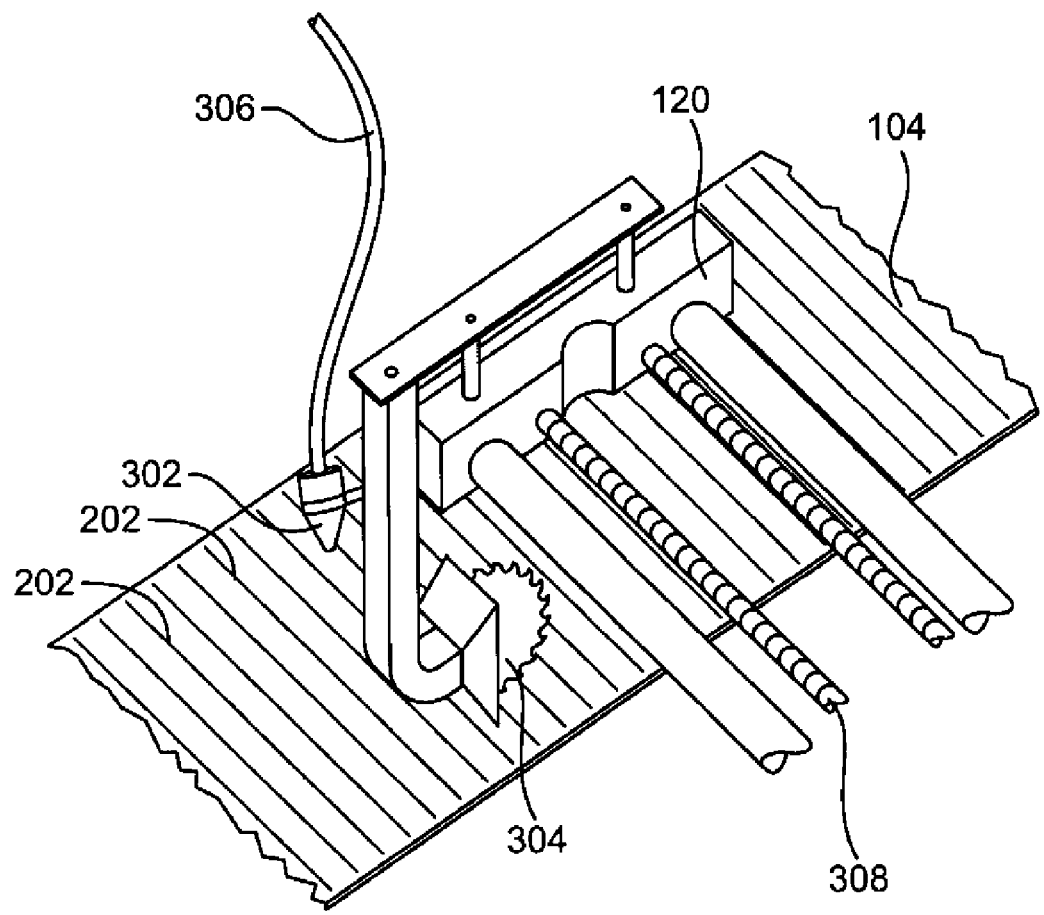
FIG. 3 is a perspective view of a filter shaping head section of the system of FIG. 1.

The system 100 also includes a filter sheet shaping section 118 downstream of the first gathering section 112 and stretching section 116. The filter shaping section 118 includes at least one moveable head 120 that is moveable laterally across the width of the filter medium 104 (see FIG. 3). In other words, the head 120 is moveable perpendicularly relative to the feed direction into any lateral position along the width of the filter medium. Further, the head 120 is moveable laterally across the width of the filter medium 104 at any of various speeds. The lateral position and speed of the head 120 can be selectively controlled by a controller 128 electrically coupled to an actuator, such as a servo motor. Referring to FIG. 3, a servo motor (not shown) is coupled to the head 120 via a pair of externally threaded rods 308. The external threads of the rods 308 mate with internal threads formed in apertures 310 of the head 120 such that rotation of the rods causes the head to move linearly along the rods 308. For stability and quality control, the filter shaping section 118 can include guide rails 312 to at least partially support and guide the head 120.

Referring to FIG. 3, the head 120 includes a cutting tool 304 positionable to contact and cut the filter medium as is it is fed through the filter shaping section 118. The cutting tool 304 can include a shearing blade to form continuous cuts through the filter medium to concurrently cut away excess sections of the filter medium or a perforating blade to form perforated cuts in the filter medium for removing excess sections of the filter medium at a later stage. Alternatively, in some embodiments, the cutting tool 304 can include one or more of a laser cutter, water jet cutter and air jet cutter.

Figure 5:
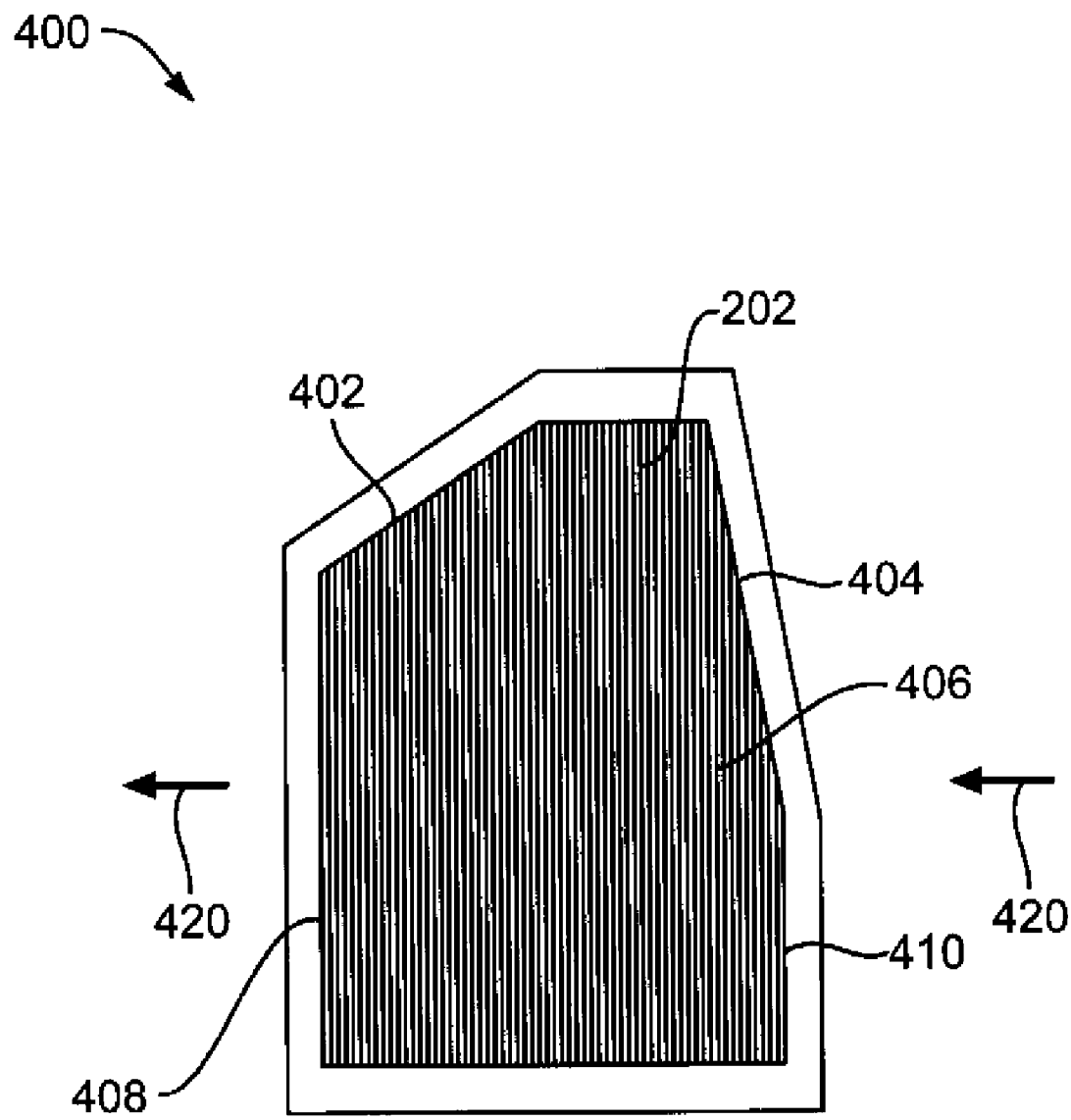
FIG. 5 is a top plan view of an irregularly shaped panel filter according to one exemplary embodiment.

The moveable head 120 and the filter medium feed rate are cooperatively controlled to cut the filter medium into a filter sheet having a predefined shape. For example, the head 120 can be moved laterally across a width of the filter medium at a constant or variable speed to cut an irregular pattern in the filter medium as the filter medium moves through the shaping section 118 at a predetermined speed. In one specific implementation, the movement of the head 120 and rate of the filter medium feed are controlled to form a sheet having the shape illustrated in panel filter 400 of FIG. 5. The filter sheet 406 of panel filter 400 includes a first angled edge 402 and a second angled edge 404. As defined herein, an angled edge is an edge that forms an angle with the width and/or length of the filter medium that is more than zero-degrees and less than 90-degrees.

The first angled edge 402 can be formed by stopping the filter medium feed and moving the head 120 laterally (e.g., in a first lateral direction parallel to width dimension W) to cut a non-angled edge 408 with the cutting tool 304. At the intersection of non-angled edge 406 and angled edge 402, the filter medium feed can be restarted and feed in the feed direction 420 at a constant speed, and the head 120 can continue its movement laterally along the width of the filter medium at a first predetermined speed. The combination of lateral movement of the cutting tool 304 and feeding the filter medium in the feed direction 420 cuts the angled edge 402 in the filter medium. Once the angled edge 402 is cut, the lateral position of the head 120 is held steady and the filter medium is feed through the shaping section 118 until the beginning of the angled edge 404. At this point, the head 120, and thus the cutting tool 304, are moved laterally (e.g., in a second lateral direction opposite the first lateral direction) at a second predetermined speed, with the filter medium feed rate being held steady, to cut the second angled edge 404. The second predetermined speed of the head 120 is faster than the first predetermined speed such that the angle of the angled edge 404 is steeper in the vertical direction as shown than the angle of the angled edge 402. The filter medium feed is then stopped and the head 120 and cutting tool 304 move in the second lateral direction to cut the non-angled edge 410.

Figure 6:
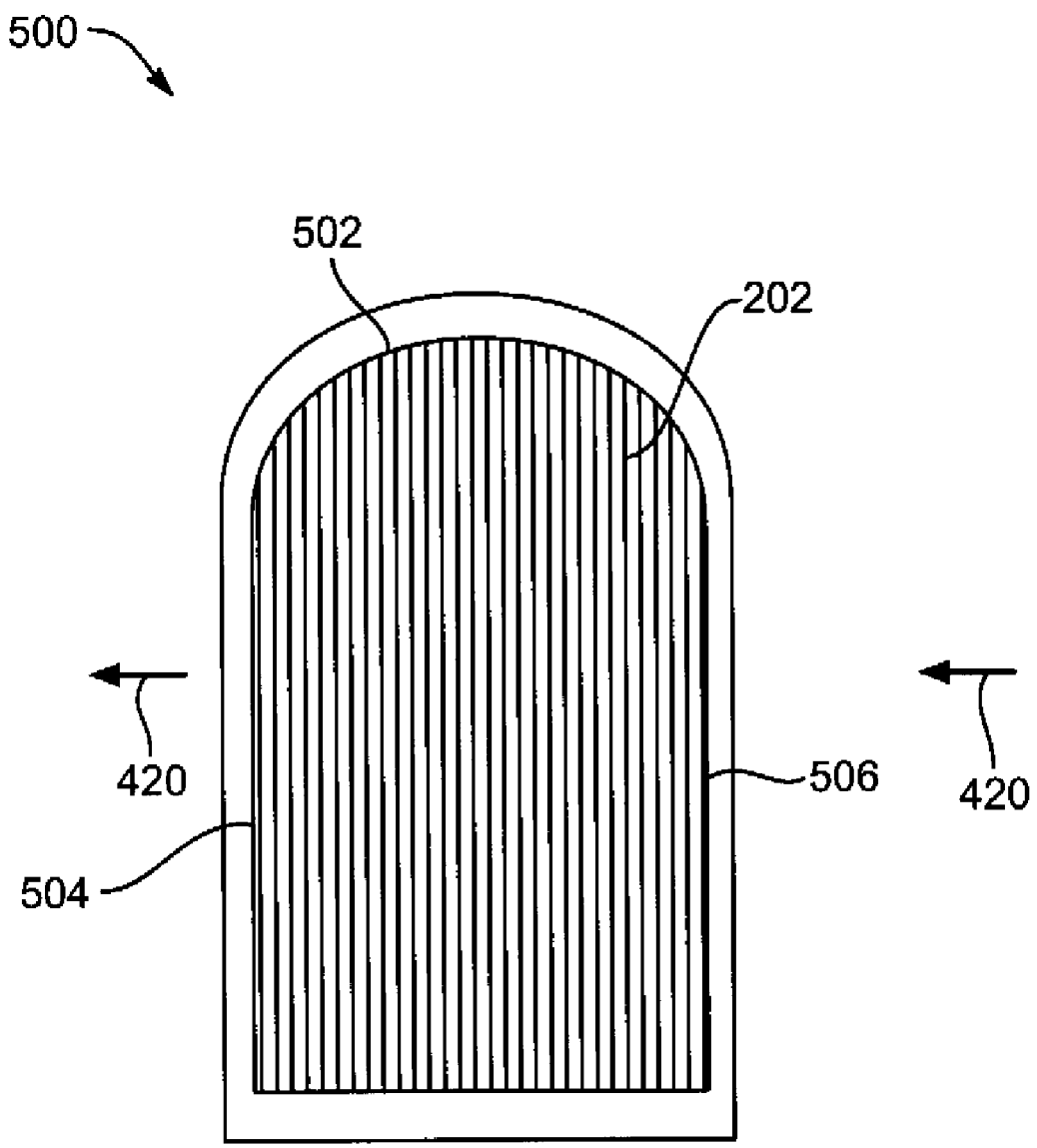
FIG. 6 is a top plan view of an irregularly shaped panel filter according to another exemplary embodiment.

Referring to FIG. 6, the filter shaping section 118 can be configured to form curved edges, such as curved edge 502 of panel filter 500. The curved edge 502 can be formed using techniques similar to that discussed above in relation to panel filter 400. More specifically, the non-angled edge 504 can first be formed by stopping the feed of filter medium and moving the head 120 and cutting tool 304 in the first lateral direction. Once the cutting tool 304 reaches the intersection of the non-angled edge 504 and the curved edge 502, the filter medium feed can be restarted. The head 120 and cutting tool 304 continue to move in the first lateral direction, but the speed of the head changes, i.e., accelerates/decelerates, to form the curved edge 502. In other words, unlike the linear angled edges 402, 404, where the speed of the head 120 in the lateral directions remains relatively constant, the curved angled edge 502 is formed by changing speed of the head 120 as the filter medium is feed through the shaping section 118. Alternatively, in some embodiments, the curved edge 502 can be formed by changing the feed rate of the filter medium 104 and holding the speed of the head 120 constant, or cooperatively changing both the filter medium feed rate and the speed of the head 120. In certain implementations, the controller 128 can configured to control the movement of the head 120 and the filter medium 104.

Referring to FIG. 3, the head 120 can also include a hot melt application tool 302 configured to apply hot melt, or other adhesive or bonding material, to a surface of the filter medium 104. Generally, the hot melt is applied on the surface of the filter medium adjacent the ends and between the pleats to at least partially seal one side of the pleats together. For example, referring to FIG. 4, hot melt 350 is disposed on surface 352 of filter sheet 354 between adjacent pleats 204 and adjacent the ends 356 of the pleats. In this manner the filter sheet 354 is sealed to prevent passage of fluid about the ends of the pleats.

The hot melt application tool 302, being part of the head 120, is also movable laterally along a width of the filter medium to any lateral position relative to the filter medium. Because the hot melt application tool 302 is part of the head 120, the hot melt application tool can be moved simultaneously with, and follow the same laterally directed path as, the cutting tool to apply hot melt adjacent the angled edges of an irregular shaped panel filter sheet simultaneously with the cutting of the angled edges by the cutting tool. For example, the hot melt application tool can be collinear with and positioned adjacent the cutting tool such that the hot melt application tool applies hot melt to a portion of an angled edge just after the portion of the edge is cut by the cutting tool.

Although in the illustrated embodiments the filter shaping section 118 is configured to move the head 120 laterally across a width of the filter medium, in other embodiments, the filter shaping section can be configured to move the head diagonally across the filter medium or longitudinally along the length of the filter medium to provide additional control over the irregular shape of the filter sheet.

Further, although a single moveable head 120 is shown in the illustrated embodiments, in other embodiments, the filter shaping section 118 can include multiple moveable heads each cooperatively moveable relative to each other. For example, in some implementations, the filter shaping section 118 can include two moveable heads with each head controlled to cut and apply hot melt to a respective side of an irregular shaped filter sheet.

Additionally, although in the illustrated embodiment, a single head 120 includes both the hot melt application tool 302 and cutting tool 304, in other embodiments, the filter shaping section 118 includes at least two moveable heads each including a respective one of the application tool 302 and cutting tool 304. In these embodiments, movement, e.g., lateral, diagonal or longitudinal, of the hot melt application tool 302 and cutting tool 304 can be independently controlled as desired.

Referring back to FIG. 1, from the filter shaping section 118, the filter medium 104 is feed to a second filter medium gathering section 122. Like the first gathering section 112, the second filter medium gathering section 122 includes driving rollers 124 upstream of two sets of paired skis 126. Again, like the first gathering section 112, the driving rollers 110 and the skis 126 are cooperatively operable to cause the filter medium to bend or fold along the score lines to reform the plurality of pleats. Similar to the driving rollers 110, the force exerted by the driving rollers 124 must be sufficient to re-bend the filter medium at each of the score lines to re-form the plurality of pleats. Because the filter medium 104 previously was bent along the score lines and the pleats previously were formed, less force is required to re-bend the filter medium along the score lines and re-pleat the filter medium. Therefore, compared with the first gathering section 112, fewer driving rollers are required to drive the filter medium between the skis 126 in the second gathering section 122.

Conventional manufacturing methods for making regularly shaped panel filters included a single gathering section downstream of the filter shaping section. Because the single gathering section is effectively the first gathering section, more driving rollers are required to form the pleats in the filter medium. The greater the number of rollers, the more surface area along the width of the filter medium that is in contact with the rollers, e.g., due to the rollers rolling over the surface area. As is known in the art, the driving rollers should not contact, e.g., roll over, the hot melt as doing so may damage the hot melt induced seal. Because with conventional manufacturing methods for making regularly shaped panel filters, the hot melt is applied solely along the length of the filter medium, the amount of surface area of the filter medium along the width of the surface medium in contact with the rollers is not of concern. However, irregularly shaped panel filter sheets typically require hot melt along at least a portion of the width of the filter medium. Therefore, conventional manufacturing methods for making regularly shaped panel filters are inadequate for making irregularly shaped panel filters as the large number of rollers employed to pleat the filter medium would most likely roll over and contact the hot melt applied along a portion of the width of the filter medium.

With the present system 100, because the second gathering section 122 has fewer rollers 124 (because the force required to pleat the filter medium is less), less surface area is in contact with the rollers as the medium is driven by the rollers than with conventional systems. Therefore, the rollers 124 of the second gathering section 122 are either less likely to contact hot melt simply because there are fewer of them, and/or it easier to strategically position the rollers 124 along the width W of the filter media 104 to avoid contact with the hot melt based on the particular irregular shape of the filter sheet being manufactured. Accordingly, the system 100 is particularly adapted to manufacture irregularly shaped panel filters by providing several advantages over and solving several shortcomings of the prior art After the pleats are re-formed by the second gathering section 122, the pleated portion of the filter medium is held in the second gathering section 122 for a predetermined period of time to permanently re-pleat the filter medium 104 according to the pleat memory. At some point following re-formation f the pleats, the hot melt and adjacent portions of the filter medium are coated with a urethane material to enhance the seal between the hot melt and filter medium.

Although not shown, an excess material removal section can be positioned downstream of the second gathering section 122 and receive the pleated filter medium 104 from the second gathering section 122. In those embodiments where the cut made by the cutting tool 304 is a perforated cut, the removal section would remove grip and remove, e.g., break away, along the perforated cut the unused portions of the filter medium, e.g., those portions of the filter medium not forming the final filter sheet. In some implementations, the removal section includes a material disposal portion, such as a shredder, that receives and shreds the unused portions of the filter medium as they are removed from the final filter sheet.

The subject matter of the present application may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for manufacturing irregularly shaped panel filters, comprising: a filter medium source capable of dispensing a continuous length of filter medium;
   a scoring section in filter medium receiving communication with the filter medium source, the scoring section operable to form score lines in the filter medium;
   a first gathering section in filter medium receiving communication with the scoring section, the first gathering section operable to fold the filter medium along the score lines;
   an unfolding section in filter medium receiving communication with the first gathering section, the unfolding section operable to unfold the folded filter medium received from the first gathering section and flattening said folded filter medium such that said filter medium is substantially flat;
   a shaping section in filter medium receiving communication with the unfolding section, the shaping section comprising at least one cutting head comprising a filter medium cutting portion, wherein said cutting head is moveable laterally across a width of the filter medium; and
   a second gathering section downstream of and in filter medium receiving communication with the shaping section, the second gathering section operable to re-fold the filter medium along the score lines;
   wherein:
   said shaping section including said cutting head is downstream of said scoring section, said first gathering section, and said unfolding section;
   said shaping section including said cutting head is upstream of said second gathering section;
   said unfolding section and said shaping section are between said first and second gathering sections, wherein the first gathering section comprises a first number of filter medium driving rollers and the second gathering section comprises a second number of filter medium driving rollers, wherein the first number is greater than the second number in order to exert a higher force to bend the filter medium at each of the score lines forming a plurality of pleats.

2. The system of claim 1, wherein said shaping section comprises a hot melt applicator.

3. The system of claim 1, wherein the filter medium cutting portion comprises a shearing blade operable to cut away portions of the filter medium.

4. The system of claim 1, wherein the filter medium cutting portion comprises a perforating blade operable to form perforations in the filter medium.

5. The system of claim 4, further comprising a material removal section in filter medium receiving communication with the second gathering section, the material removal section being operable to discard perforated sections of the filter medium.

6. The system of claim 1, wherein the first and second gathering sections each comprise:
at least two pair of opposing filter medium guides each operable to at least partially resist movement of the filter medium therebetween; and
at least one filter medium driving roller operable to drive the filter medium between the at least two pair of opposing filter medium guides.

7. The system of claim 6, wherein the driving force generated by the at least one filter medium driving roller necessary for driving roller for driving the filter medium between the filter medium guides of the first gathering section is more than the driving force generated by the at least one filter medium driving roller necessary for driving the filter medium between the filter medium guides of the second gathering section.

8. The system of claim 1, wherein said cutting head is moveable laterally across the width of the filter medium at a predetermined speed such that the cutting portion cuts the filter medium to form at least one edge that is angled with respect to the length and the width of the filter medium.

9. The system of claim 8, wherein said shaping section comprises a hot melt applicator, and wherein as said cutting head moves laterally across the width of the filter medium at the predetermined speed, the hot melt applicator is operable to apply a bead of hot melt on the filter medium along and adjacent the at least one edge.

10. The system of claim 1, wherein said shaping section comprises a first head having a filter medium cutting portion and a second head having a hot melt applicator, and wherein the first and second heads are independently moveable laterally across the width of the filter medium.

11. The system of claim 1, wherein the first gathering section is operable to maintain the filter medium in a folded configuration for a predetermined period of time.

12. An apparatus for manufacturing irregularly shaped panel filters, comprising:
a filter medium source capable of dispensing a continuous length of filter medium in a feed direction from upstream to downstream, said filter medium having a length dimension L along said feed direction, and a width dimension W transverse to said length dimension L;
a filter medium scoring section downstream of the filter medium source, the filter medium scoring section operable to form score lines in the filter medium;
a filter medium shaping section downstream of the filter medium scoring section, the shaping section comprising at least one cutting head comprising a filter medium cutting portion and comprising a hot melt applicator, wherein the at least one head is moveable laterally across a width of the filter medium at a predetermined speed to cut the filter medium with the cutting portion to form at least one edge that is angled with respect to the length and width of the filter medium and to apply a length of hot melt on the filter medium alongside the at least one edge with the hot melt applicator;
a first filter medium gathering section downstream of the filter medium shaping section, the filter medium gathering section operable to fold the filter medium along the score lines to form a plurality of pleats; and a second gathering section downstream of the filter medium shaping section wherein the second gathering section being operable to re-fold the filter medium along the score lines to reform the plurality of pleats;
wherein:
said filter medium shaping section including said cutting head is downstream of said filter medium source and said filter medium scoring section;
said filter medium shaping section including said cutting head is upstream of said filter medium gathering section;
said filter medium scoring section, said filter medium shaping section, and said filter medium gathering section are aligned along said feed direction along said continuous length of filter medium along said length dimension L, wherein the first gathering section comprises a first number of filter medium driving rollers and the second gathering section comprises a second number of filter medium driving rollers, wherein the first number is greater than the second number in order to exert a higher force to bend the filter medium at each of the score lines forming the plurality of pleats.

13. The apparatus of claim 12, wherein the cutting portion comprises a perforating blade, and wherein said cutting head is moveable laterally across the width of the filter medium at the predetermined speed to perforate the filter medium with the perforating blade.

14. The apparatus of claim 12, further comprising:
an unfolding section intermediate the first gathering section and the shaping section, the unfolding section being operable to unfold the filter medium.

15. The apparatus of claim 12, further comprising a controller electrically coupled to the filter medium shaping section, wherein the controller is operable to control the lateral position and speed of said cutting head.

16. The apparatus of claim 12, wherein the predetermined speed is changeable as said cutting head moves laterally across the width of the filter medium.

17. The apparatus of claim 12, wherein the at least one edge comprises a plurality of edges each angled with respect to an adjacent edge.

18. The apparatus of claim 12, wherein the at least one edge comprises a curved portion.

19. A system for manufacturing irregularly shaped panel filters, comprising: a filter medium source capable of dispensing a continuous length of filter medium along a feed direction from upstream to downstream, said filter medium having a length dimension L along said feed direction, and a width dimension W transverse to said length dimension L;
a scoring section in filter medium receiving communication with the filter medium source, the scoring section operable to form score lines in the filter medium;
a first gathering section in filter medium receiving communication with the scoring section, the first gathering section operable to fold the filter medium along the score lines;
an unfolding section in filter medium receiving communication with the first gathering section, the unfolding section operable to unfold the folded filter medium received from the first gathering section;

a shaping section in filter medium receiving communication with the unfolding section, the shaping section comprising at least one cutting head comprising a filter medium cutting portion, wherein said cutting head is moveable laterally across a width of the filter medium; and a second gathering section downstream of and in filter medium receiving communication with the shaping section, the second gathering section operable to re-fold the filter medium along the score lines;

wherein:

said shaping section including said cutting head is downstream of said scoring section, said first gathering section, and said unfolding section;

said shaping section including said cutting head is upstream of said second gathering section;

said scoring section, said first gathering section, said shaping section, and said second gathering section are aligned along said feed direction along said continuous length of filter medium along said length dimension L, wherein the first gathering section comprises a first number of filter medium driving rollers and the second gathering section comprises a second number of filter medium driving rollers, wherein the first number is greater than the second number in order to exert a higher force to bend the filter medium at each of the score lines forming a plurality of pleats.

20. A system for manufacturing irregularly shaped panel filters, comprising:

a filter medium source capable of dispensing a continuous length of filter medium in a feed direction from upstream to downstream, said filter medium having a length dimension L along said feed direction, and a width dimension W transverse to said length dimension L;

a scoring section in filter medium receiving communication with the filter medium source, the scoring section operable to form score lines in the filter medium;

a first gathering section having driving rollers and in filter medium receiving communication with the scoring section, the first gathering section operable to fold the filter medium along the score lines;

an unfolding section in filter medium receiving communication with the first gathering section, the unfolding section operable to unfold the folded filter medium received from the first gathering section;

a shaping section in filter medium receiving communication with the unfolding section, the shaping section comprising at least one cutting head comprising a filter medium cutting portion, wherein said cutting head is movable laterally along said width dimension W; and a second gathering section having driving rollers and downstream of and in filter medium receiving communication with the shaping section, the second gathering section operable to re-fold the filter medium along the score lines;

wherein said second gathering section has fewer driving rollers than said first gathering section as enabled by less force required to re-fold the filter medium while the greater numbers of driving rollers in the first gathering section exert a higher force to bend the filter medium at each of the score lines forming a plurality of pleats.

* * * * *